United States Patent
Chung

(10) Patent No.: US 12,327,990 B2
(45) Date of Patent: Jun. 10, 2025

(54) CABLE GUIDES

(71) Applicant: Hewlett-Packard Development Company, L.P., Spring, TX (US)

(72) Inventor: Tien Liang Chung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 288 days.

(21) Appl. No.: 18/250,968

(22) PCT Filed: Oct. 29, 2020

(86) PCT No.: PCT/US2020/057904
§ 371 (c)(1),
(2) Date: Apr. 27, 2023

(87) PCT Pub. No.: WO2022/093227
PCT Pub. Date: May 5, 2022

(65) Prior Publication Data
US 2023/0400894 A1    Dec. 14, 2023

(51) Int. Cl.
*H02G 3/32* (2006.01)
(52) U.S. Cl.
CPC .................................... *H02G 3/32* (2013.01)
(58) Field of Classification Search
CPC .................................. H02G 3/30; H02G 3/32
See application file for complete search history.

(56) References Cited

U.S. PATENT DOCUMENTS

| | | | |
|---|---|---|---|
| 5,581,440 A | 12/1996 | Toedter | |
| 6,305,556 B1 | 10/2001 | Mayer | |
| 6,550,723 B2 | 4/2003 | Fraley et al. | |
| 6,827,595 B2* | 12/2004 | Larson | H05K 7/1414 439/160 |
| 7,459,634 B2* | 12/2008 | Martin | G06F 1/1603 248/920 |
| 8,042,365 B2 | 10/2011 | Morrison et al. | |
| 9,681,575 B2 | 6/2017 | Bharucha et al. | |
| 2010/0273357 A1 | 10/2010 | Schoene et al. | |
| 2018/0080580 A1 | 3/2018 | Coulter | |
| 2018/0113493 A1 | 4/2018 | Silvanto et al. | |
| 2022/0214726 A1* | 7/2022 | Chung | H05K 5/0221 |

FOREIGN PATENT DOCUMENTS

JP  2018-521384 A  8/2018
RU  2441302 C2    1/2012

* cited by examiner

*Primary Examiner* — Paresh Paghadal
(74) *Attorney, Agent, or Firm* — Quarles & Brady LLP

(57) ABSTRACT

In some examples, an apparatus can include a latch including a latch flange, where the latch flange includes a hook to interface with a housing, and a cable guide including a cable flange to interface with the latch, where the cable flange is secured in the housing when the cable guide is in a disengaged position, and the cable flange and the housing are to form a pathway when the cable guide is in an engaged position.

15 Claims, 9 Drawing Sheets

CABLE GUIDES

BACKGROUND

Computing devices can transmit information to and/or from other devices. Such devices may be, for instance, peripheral devices. For example, a computing device may connect to a peripheral device via a wired connection. Such a wired connection may connect the peripheral device to a port on the computing device and/or associated peripheral device.

Such ports may include input/output (I/O) ports. Examples of I/O ports can include universal serial bus (USB) ports, audio jacks, card readers, power jacks, High-Definition Multimedia Interface (HDMI), register jack (RJ) s, among others. As described above, I/O ports can be used to support various peripheral devices that may be used in conjunction with the computing device, such as data drives, keyboards, mice, displays, and the like.

DETAILED DESCRIPTION

As mentioned, input/output (I/O) ports such as universal serial bus (USB) ports can be used to support various peripheral devices such as data drives, keyboards, mice, displays, and the like. Accordingly, such a peripheral device may include a wired connection to connect to such an I/O port.

In some examples, a computing device may utilize multiple I/O ports. Such use of multiple I/O ports can result in multiple wired connections, each with associated cables. As used herein, the term "cable" refers to an insulated electrical conductor. Such cables can, for instance, allow a peripheral device to connect to an I/O port of a computing device and allow the transfer of information (e.g., data) and/or power therebetween.

Multiple wired connections can result in multiple cables. Such an amount of cables can result in an unsightly space in and/or around a computing device. Further, multiple wired connections can result in tangled or otherwise disheveled cables, which can result in a poor user experience.

Moreover, without the routing of such a cable connected to an I/O port, chances for theft can be increased relative to using a cable routing solution. For example, an unauthorized individual may more easily disconnect a peripheral device from an I/O port of a computing device to steal the peripheral device as compared with approaches utilizing secure cable routing.

In some examples, cables may be routed and/or secured utilizing a cable tie. However, cable ties can be difficult to release when a user may want to move a cable and/or disconnect and/or altogether remove a peripheral device connected to an I/O port of a computing device. In some instances, the cable tie may have to be physically cut off. As a result, cable ties may not be easily reusable.

Cable guides according to the disclosure can allow for a routing mechanism including a latch and cable guide to provide an easy to use cable routing apparatus. The cable guide can be secured in a housing of a computing device and/or display when the apparatus is not in use to provide a pleasing aesthetic. Additionally, the cable guide can form a pathway with the housing when the cable guide is to be used to route a cable. Further, the latch can include a lock slot to allow for use of a locking mechanism in order to prevent theft of a peripheral device. Accordingly, cable guides according to the disclosure can provide for a reusable and easy to use cable routing apparatus as compared with previous approaches.

Figure 1B:
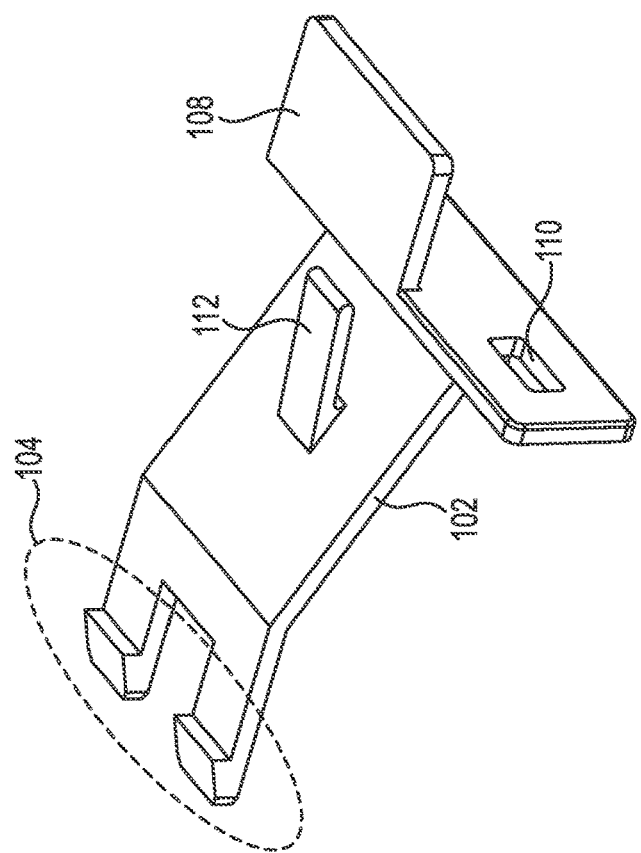
FIG. 1B is a perspective view of an example of a latch of a routing mechanism for cable guides consistent with the disclosure.
Figure 1A:
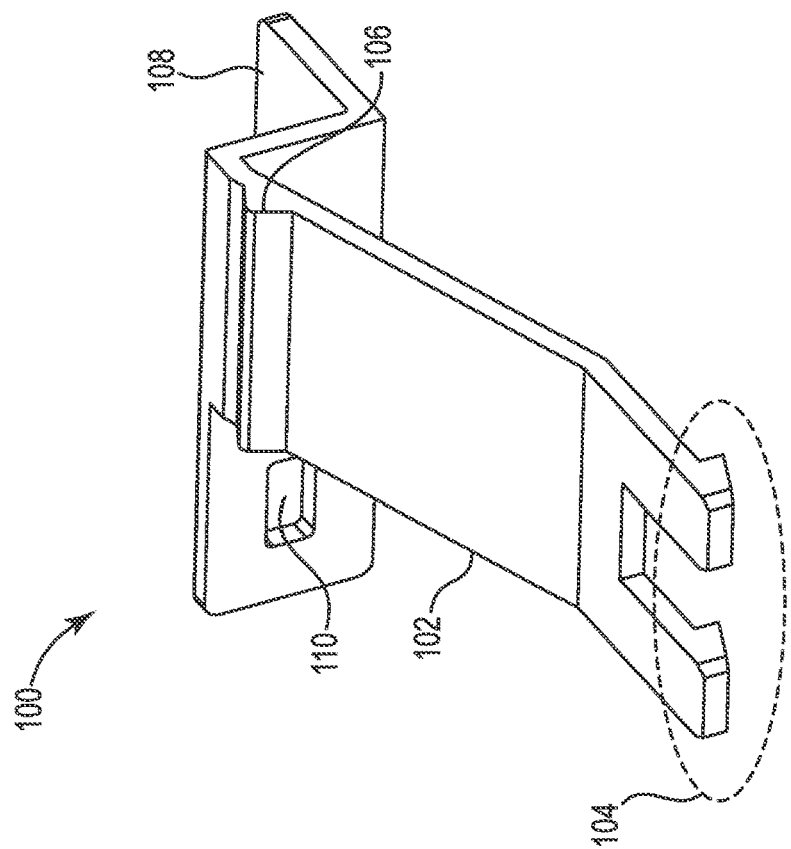
FIG. 1A is a perspective view of an example of a latch of a routing mechanism or cable guides consistent with the disclosure.

FIG. 1A is a perspective view of an example of a latch 100 of a routing mechanism for cable guides consistent with the disclosure. As illustrated in FIG. 1A, the latch 100 can include a latch flange 102, a hook 104, a latch tooth 106, a release tab 108, and a lock slot 110.

As described above, a routing mechanism can include a latch 100 and a cable guide (e.g., cable guide 214, as is further described in connection with FIGS. 2A and 2B). The latch 100 and the cable guide can interface together in order to provide a cable routing mechanism to route cables in and/or around a housing, as is further described herein.

As illustrated in FIG. 1A, the latch 100 can include a latch flange 102. As used herein, the term "latch" refers to a device to mechanically attach to another device. For example, the latch 100 can mechanically attach to a housing via a hook 104, as is further described herein, and to a cable guide, as is further described herein.

As mentioned above, the latch 100 can include a latch flange 102. As used herein, the term "latch flange" refers to an external ridge or rim of material from a latch to provide a place for attachment of another object. In some examples, the latch flange 102 can be a continuous extension of material from the latch tooth 106 (as is further described herein). In other words, the release tab 108, the latch tooth 106, the latch flange 102, and the hook 104 can be a unitary body.

The latch flange 102 can include a hook 104. As used herein, the term "hook" refers to an appendage that is to pull on another object in order to interface with the other object.

For example, the hook 104 can interface with a rib of a housing so as to interface with (e.g., attach to) a housing, as is further described in connection with FIG. 3. As illustrated in FIG. 1A, the hook 104 can include two "prongs" in order to interface with ribs of the housing. However, examples of the disclosure are not so limited, as the hook 104 can include more than two prongs or less than two prongs.

The latch flange 102 can further include a latch tooth 106. As used herein, the term "latch tooth" refers to a projection of material from a latch to interface with another object. The latch tooth 106 can interface with other teeth of a cable guide, as is further described in connection with FIGS. 2A, 2B, and 3.

As illustrated in FIG. 1A, the latch 100 can further include a release tab 108. As used herein, the term "release tab" refers to a projection of material to receive a force. Such a force can cause a bending moment in the latch flange 102 to cause the latch to move from a secure position to a release position, as is further described in connection with FIGS. 6 and 7.

The latch 100 can further include a lock slot 110. As used herein, the term "lock slot" refers to an opening in the material of the latch. The lock slot 110 can be an opening through the latch 100 that can receive a locking mechanism, as is further described in connection with FIG. 9.

FIG. 1B is a perspective view of an example of a latch 100 of a routing mechanism for cable guides consistent with the disclosure. As illustrated in FIG. 1B, the latch 100 can include a latch flange 102, a hook 104, a release tab 108, a lock slot 110, and a spring tab 112.

As illustrated in FIG. 1B, the latch flange 102 can further include a spring tab 112. As used herein, the term "spring tab" refers to a projection of material from a body to bias the body to a position. For example, the spring tab 112 can be a projection of material from the latch flange 102 to bias the latch 100 to a position (e.g., a secure position, as is further described in connection with FIG. 4). When the spring tab 112 experiences a bending moment, the spring tab 112 can bend and the latch 100 moves from a secure position to a release position and when the bending moment is removed, the spring tab 112 can cause the latch 100 to move back to a secure position. In other words, the spring tab 112 may be a resilient component capable of returning to its original or starting position or shape after undergoing a deformation.

As mentioned above, the latch 100 can interface with a cable guide. The cable guide is further described in connection with FIGS. 2A and 2B.

Figure 2A:
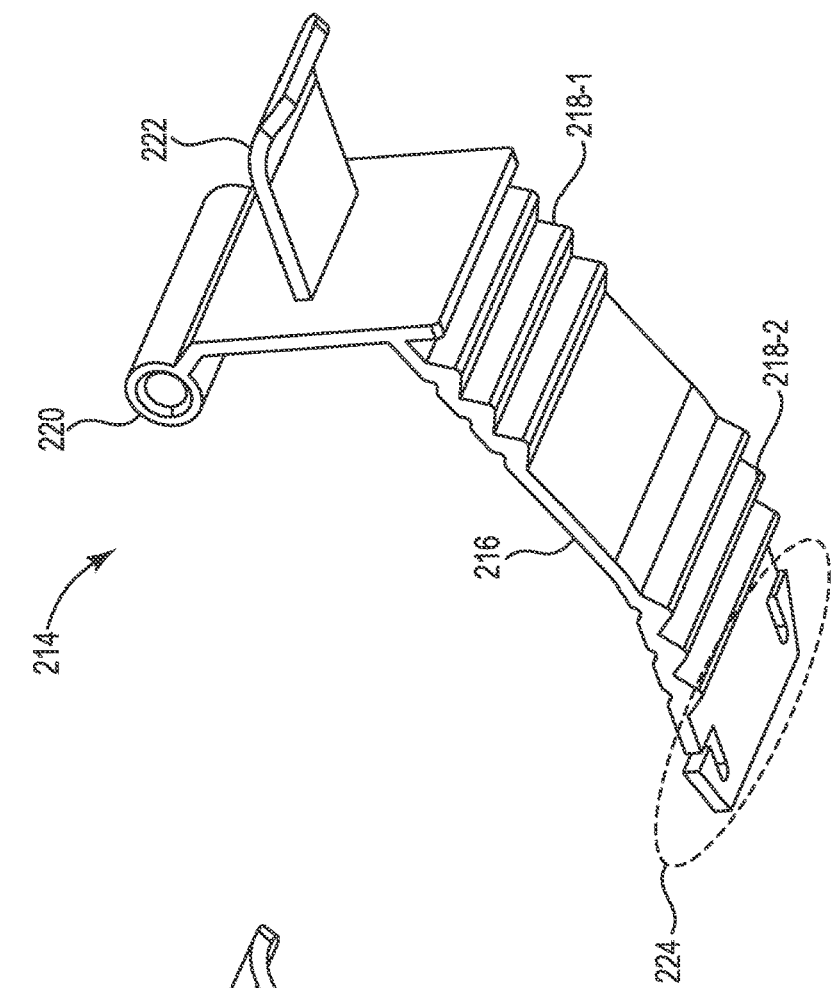
FIG. 2A is a perspective view of an example of a cable guide of a routing mechanism for cable guides consistent with the disclosure.

FIG. 2A is a perspective view of an example of a cable guide 214 of a routing mechanism for cable guides consistent with the disclosure. The cable guide 214 can include a cable flange 216, cable guide teeth 218-1, 218-2, an attachment annulus 220, an operate tab 222, and a spring arm 224.

As illustrated in FIG. 2A, the cable guide 214 can include a cable flange 216. As used herein, the term "cable guide" refers to a device shaped to route a cable. For example, the cable guide 214 can be shaped in a manner to support and/or direct a cable, where the cable guide 214 in combination with a housing can provide a pathway for a cable, as is further described in connection with FIGS. 7-9.

As mentioned above, the cable guide 214 can include a cable flange 216. As used herein, the term "cable flange" refers to an external ridge or rim of material from a cable guide to provide a place for attachment of another object. In some examples, the cable flange 216 can be a continuous extension of material from the attachment annulus 220 (as is further described herein). In other words, the attachment annulus 220, the cable flange 216, the operate tab 222, the cable guide teeth 218-1, 218-2, and the spring arm 224 can be a unitary body.

The cable flange 216 can include a spring arm 224. As used herein, the term "spring arm" refers to an extension of material to interface with another object. For example, the spring arm 224 can interface with a surface of a housing to prevent the cable flange 216 from being pulled out of the housing, as is further described in connection with FIG. 7.

The cable flange 216 can include an attachment annulus 220. As used herein, the term "attachment annulus" refers to a ring-shaped part having a space to connect the part to another object. For example, the attachment annulus 220 can be utilized to connect the cable guide 214 to a housing, as is further described in connection with FIG. 3. In some examples, the attachment annulus may have a structure other than ring-shaped (e.g., rectangular, hexagonal, etc.)

Figure 2B:
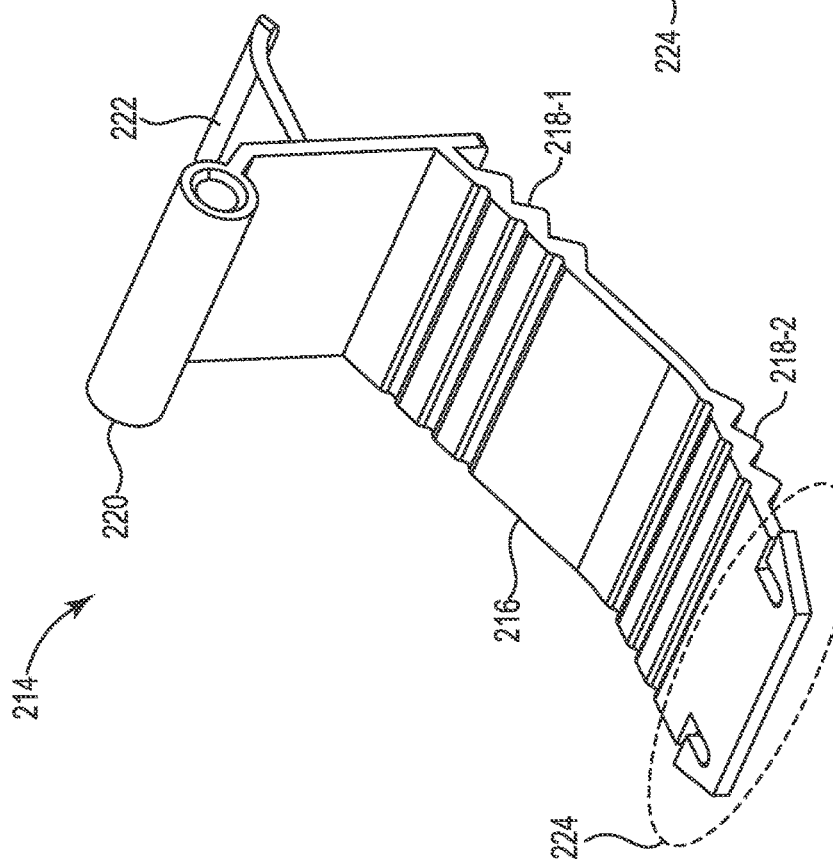
FIG. 2B is a perspective view of an example of a cable guide of a routing mechanism for cable guides consistent with the disclosure.

FIG. 2B is a perspective view of an example of a cable guide 214 of a routing mechanism for cable guides consistent with the disclosure. The cable guide 214 can include a cable flange 216, cable guide teeth 218-1, 218-2, an attachment annulus 220, an operate tab 222, and a spring arm 224.

As illustrated in FIG. 2B, the cable flange 216 can include cable guide teeth 218-1, 218-2. As used herein, the term "cable guide tooth" refers to a projection of material from a cable flange to interface with another object. The cable guide teeth 218-1, 218-2 can interface with the latch tooth (e.g., latch tooth 106, previously described in connection with FIG. 1A) of the latch, as is further described in connection with FIG. 3. Further, as illustrated in FIG. 2B, the cable guide teeth 218-1, 218-2 are illustrated as including three teeth. However, examples of the disclosure are not so limited. For example, cable guide teeth 218-1, 218-2 can include different numbers of teeth. Further, cable guide teeth 218-1, 218-2 can include more than three teeth or less than three teeth.

The cable guide 214 can include an operate tab 222, As used herein, the term "operate tab" refers to a projection of material to receive a force and transfer such force to the remainder of the cable guide 214. Such a force can cause rotation of the cable guide 214 about the attachment annulus 220 to cause the cable guide 214 to move from a disengaged position to an engaged position, as is further described in connection with FIGS. 6 and 7.

Figure 3:
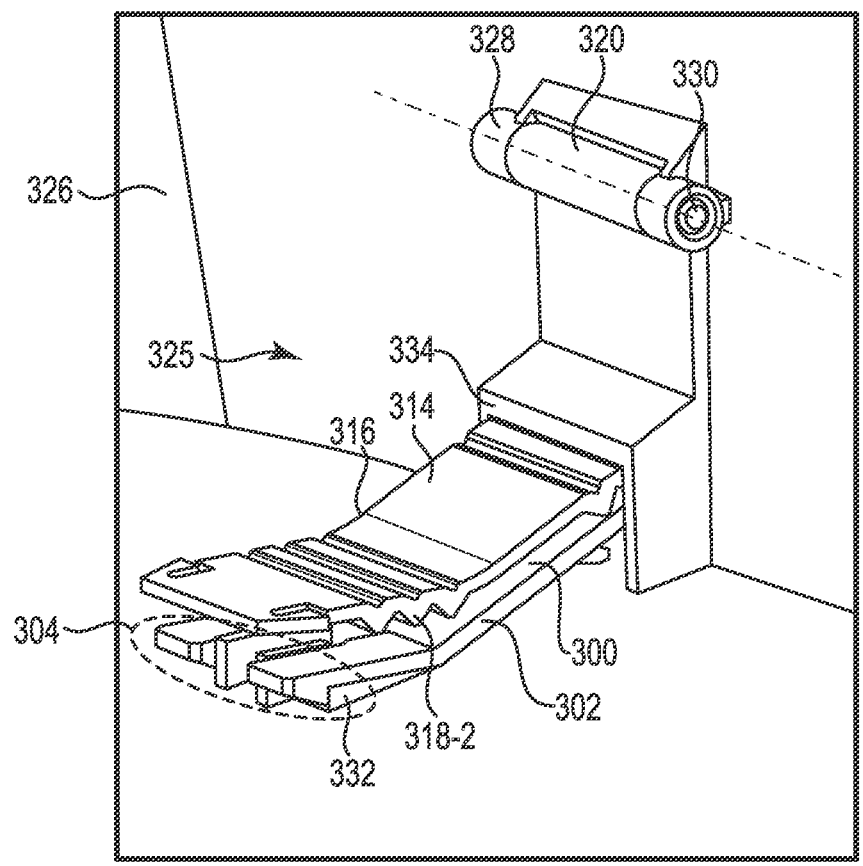
FIG. 3 is a perspective view of an example of a routing mechanism in a housing consistent with the disclosure.

FIG. 3 is a perspective view of an example of a routing mechanism 325 in a housing 326 consistent with the disclosure. The routing mechanism 325 can include a latch 300 and a cable guide 314.

As illustrated in FIG. 3, the routing mechanism 325 can be located in a housing 326. As used herein, the term "housing" refers to an enclosure or other support structure of a device. For example, the housing 326 can be an outer shell making up a portion of a computing device, a display device, an all-in-one (AIO) computing device, etc.

The housing 326 can include a rib 332 and a recessed surface 334. As used herein, the term "rib" refers to a projection or protrusion of a device. For example, the rib 332 can be an extension of material of the housing 326. The rib can interface with a hook 304 of the latch 300, as is further described herein.

The recessed surface 334 can be a portion of a structure defining an opening in the housing 326. As used herein, the term "recessed surface" refers to a portion of a structure that is located away from an outer surface of the structure. The recessed surface 334 can be located on an interior portion of the housing 326. As described above, the opening in the housing 326 can receive the routing mechanism 325 and its constituent components, as is further described herein.

The routing mechanism 325 can include the latch 300 and the cable guide 314. As previously described in connection with FIGS. 1A, 1B, 2A, and 2B, the latch 300 can include a latch flange 302 and a lock slot (e.g., not illustrated in the perspective view of FIG. 3), where the latch flange 302 can include a latch tooth (e.g., not illustrated in the perspective view of FIG. 3) and the hook 304.

The hook 304 can interface with the rib 332 of the housing 326. For example, the hook 304 can be shaped such that a surface of the hook can be positioned substantially adjacent to a surface of the rib 332 so that the rib 332 can prevent lateral (or substantially lateral) motion of the latch 300. The rib 332 can prevent the hook 304 from being translated (e.g., moved) out of the housing 326.

As previously described in connection with FIGS. 1A, 1B, 2A, and 2B, the cable guide 314 can include a cable flange 316. The cable flange 316 can include a first cable guide tooth (e.g., not illustrated in the perspective view of FIG. 3), a second cable guide tooth 318-2, and an attachment annulus 320.

As illustrated in FIG. 3, the cable guide 314 is in a disengaged position. As used herein, the term "disengaged position" refers to an orientation of the cable guide in which the cable guide is substantially disposed within the housing and no pathway is formed with the housing. In the disengaged position, the cable guide 314 does not provide for a pathway for routing cables, as there may not be any cables to route, the user may be transporting the housing 326, etc.

The first cable guide tooth can engage with the latch tooth of the latch 300, as is further described in connection with FIG. 4. The second cable guide tooth 318-2 can interface with the latch tooth when the cable guide 314 is in an engaged position, as is further described in connection with FIG. 7.

The cable guide 314 can include an attachment annulus 320. The attachment annulus 320 can connect the cable guide 314 to the housing 326. For example, the housing 326 can further include a coupling annulus 328. As used herein, the term "coupling annulus" refers to a ring-shaped part having a space to connect the part to another object. In some examples, the coupling annulus 328 may have a structure other than ring-shaped (e.g., rectangular, hexagonal, etc.) When the coupling annulus 328 and the attachment annulus 320 are coaxially aligned, the coupling annulus 328 and the attachment annulus 320 can receive a pin 330. The pin 330 can rotatably connect the cable guide 314 to the housing 326.

Figure 4:
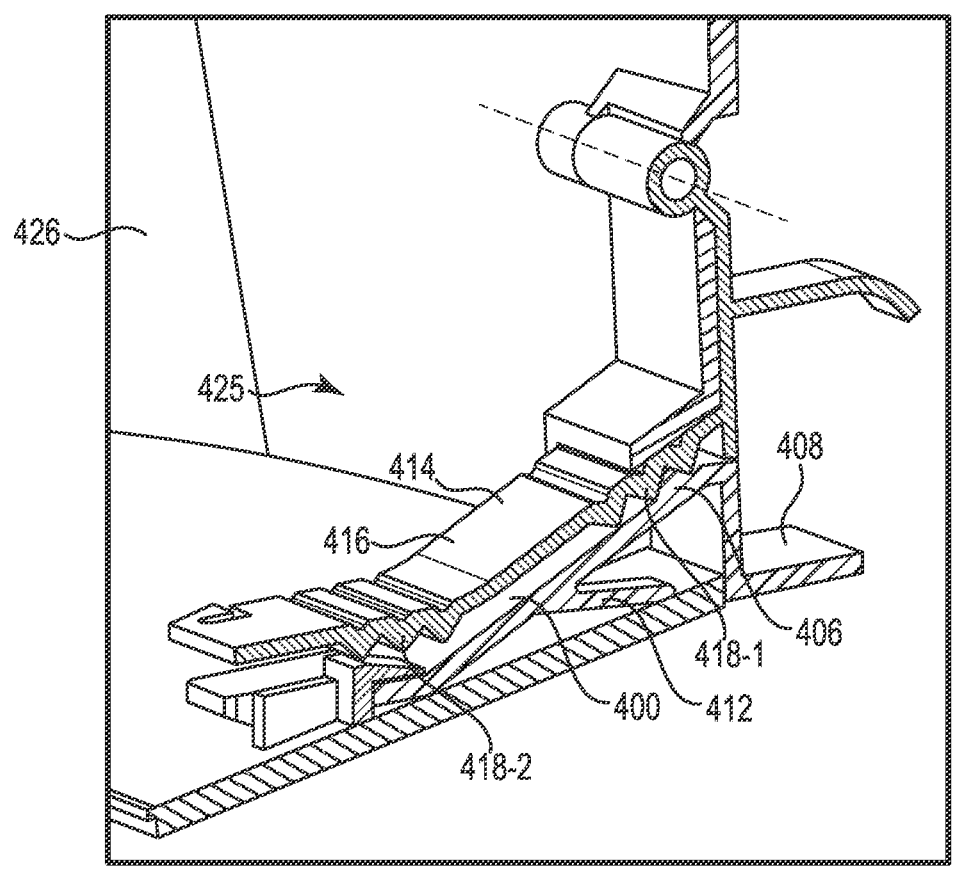
FIG. 4 is a section view of an example of a routing mechanism in a housing consistent with the disclosure.

FIG. 4 is a section view of an example of a routing mechanism 425 in a housing 426 consistent with the disclosure. The routing mechanism 425 can include a latch 400 and a cable guide 414.

As illustrated in FIG. 4, the cable guide 414 can be in the disengaged position. The cable flange 416 can include the first cable guide tooth 418-1. When the cable guide 414 is in the disengaged position, the first cable guide tooth 418-1 can engage with the latch tooth 406. For example, the projection of material comprising the first cable guide tooth 418-1 can be positioned substantially adjacent to the projection of material comprising the latch tooth 406 such that the interfacing first cable guide tooth 418-1 and the latch tooth 406 interfere with one another so as to prevent lateral (or substantially lateral) motion of the cable guide 414.

The latch tooth 406 can engage with the first cable guide tooth 418-1 to secure the cable guide 414 in the disengaged position when the latch 400 is in the secure position. As used herein, the term "secure position" refers to an orientation of the latch in which a tooth of the latch is engaged with a tooth of a cable guide. For example, when the latch 400 is in a secure position (e.g., as illustrated in FIG. 4), the latch 400 prevents any lateral (or substantially lateral) movement of the cable guide 414.

As illustrated in FIG. 4, the latch 400 further includes a spring tab 412. The spring tab 412 can bias the latch 400 towards the secure position. For example, the spring tab 412 can provide a force on the latch 400 such that the latch 400 remains in the secure position unless acted upon by another force (e.g., on the release tab 408), as is further described in connection with FIG. 6.

The cable guide 414 further includes a second cable guide tooth 418-2. The second cable guide tooth 418-2 can engage with the latch tooth 406 when the cable guide 414 is in an engaged position, as is further described in connection with FIG. 7.

Figure 5:
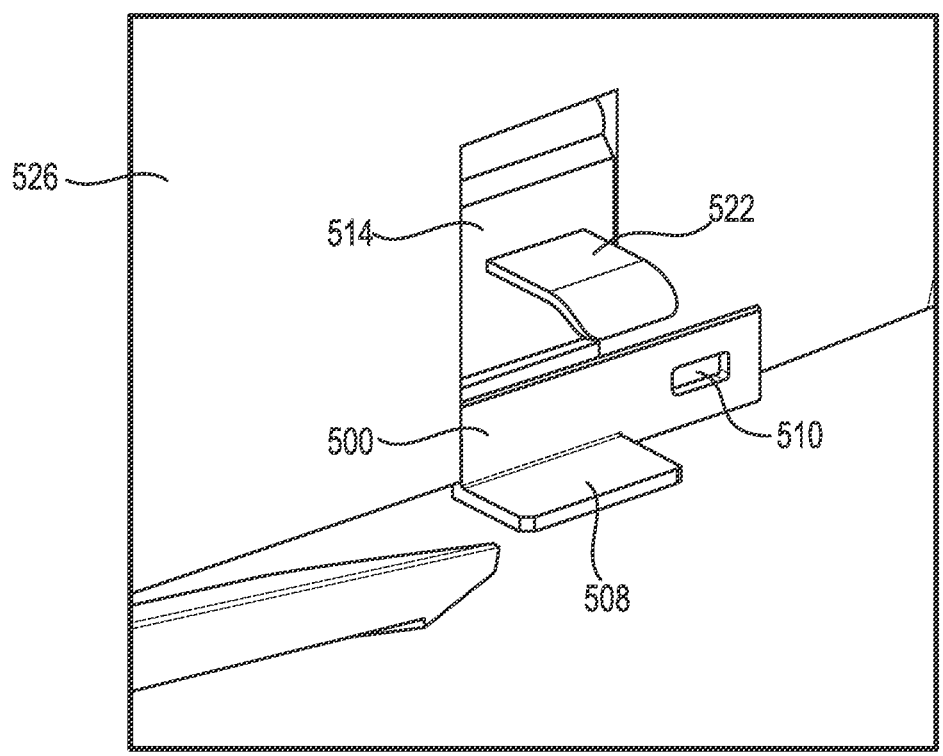
FIG. 5 is a perspective view of an example of a housing, a latch, and a cable guide in a disengaged position secured in the housing consistent with the disclosure.

FIG. 5 is a perspective view of an example of a housing 526, a latch 500, and a cable guide 514 in a disengaged position secured in the housing 526 consistent with the disclosure. The latch 500 can include a release tab 508 and a lock slot 510. The cable guide 514 can include an operate tab 522.

As illustrated in FIG. 5, the cable flange of the cable guide 514 is in the disengaged position. In the disengaged position, the cable flange of the cable guide 514 can be secured in the housing 526 where the latch 500 can be in the secure position to keep the cable guide 514 in the disengaged position. As such, no pathway is formed for routing a cable when the cable flange of the cable guide 514 is in the disengaged position.

Figure 6:
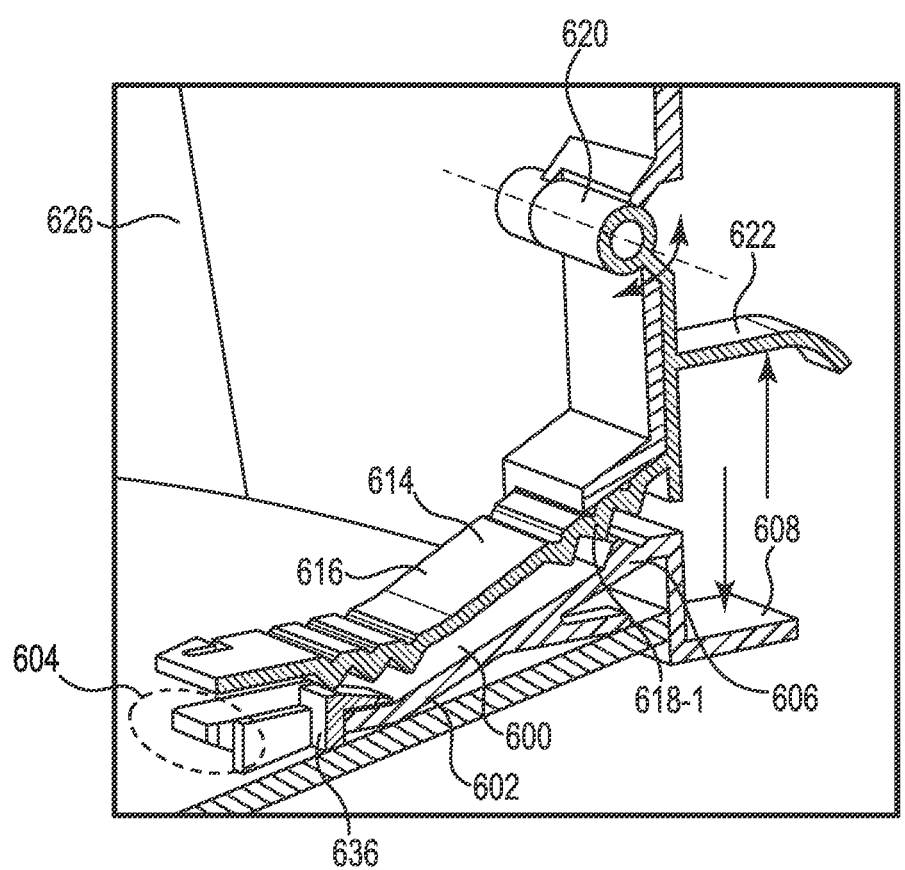
FIG. 6 is a section view of an example of a housing, a latch being depressed from a secure position to a release position, and a cable guide in a disengaged position consistent with the disclosure.

FIG. 6 is a section view of an example of a housing 626, a latch 600 being depressed from a secure position to a release position, and a cable guide 614 in a disengaged position consistent with the disclosure. The cable flange 616 of the cable guide 614 can be disposed in the housing 626.

As illustrated in FIG. 6, the latch 600 can receive a force. Specifically, the release tab 608 can receive a force in a downwards direction (e.g., as oriented in FIG. 6). For example, a user may depress (in a substantially downwards manner) the release tab 608. In response to the force on the release tab 608, the latch 600 is to move from the secure position to a release position. As used herein, the term "release position" refers to an orientation of the latch in which a tooth of the latch is disengaged from a tooth of a cable guide. For example, the first cable guide tooth 618-1 can disengage from the latch tooth 606 when the latch 600 is in the release position. When the latch 600 is in the release position (e.g., as illustrated in FIG. 6), the latch 600 can allow lateral (or substantially lateral) movement of the cable guide 614 as is further described herein. When the latch 600 is moved from the secure position to the release position, the cable guide 614 is movable from the disengaged position (e.g., as illustrated in FIG. 6) to an engaged position (e.g., as is further described in connection with FIG. 7.

The housing 626 can further include an anchor flange 636, As used herein, the term "anchor flange" refers to an external ridge or rim of material from a housing to provide a place for attachment of another object. For example, the anchor flange 636 can be a continuous extension of material from the housing 626 that can receive a portion of the latch flange 602, The anchor flange 636 can secure the latch flange 602 when the latch 600 is moved from the secure position to the release position. For example, when the release tab 608 receives the downward force (e.g., as indicated in FIG. 6), the anchor flange 636 can prevent an opposite upward force of the latch flange 602 to prevent the hook 604 from disengaging from the rib of the housing 626 due to the latch 600 pivoting about the spring tab 612.

Figure 7:
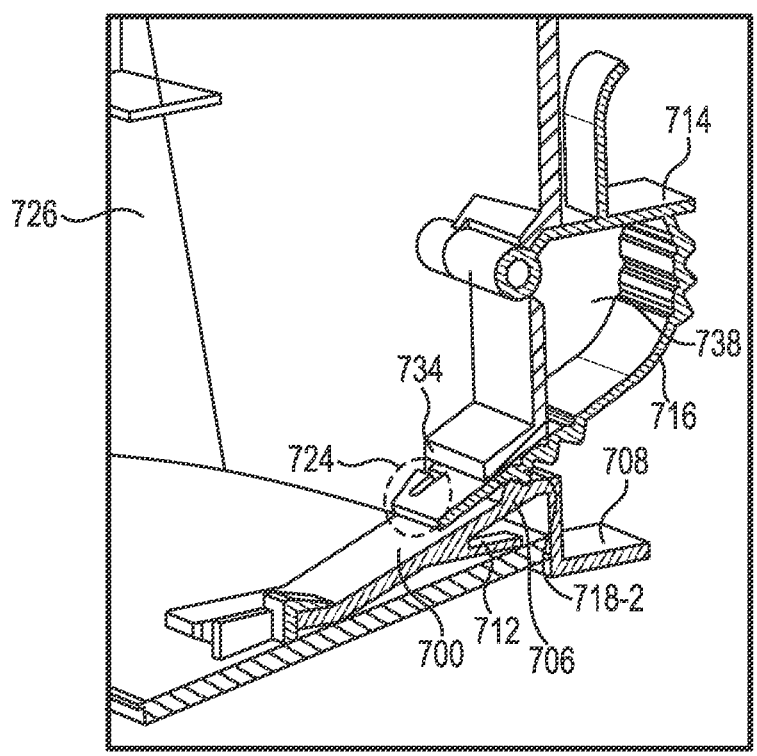
FIG. 7 is a section view of an example of a housing, a latch in a secure position, and a cable guide in an engaged position forming a pathway consistent with the disclosure.

When the latch 600 is in the release position, the cable guide 614 can move from the disengaged position to the engaged position. For example, a force can be applied to the operate tab 622 of the cable guide 614 (e.g., as illustrated in FIG. 6) to move the cable guide 614 from the disengaged position to the engaged position (e.g., as is further described in connection with FIG. 7). The cable guide 614 can be movable from the disengaged position to the engaged position about the attachment annulus 620, FIG. 7 is a section view of an example of a housing 726, a latch 700 in a secure position, and a cable guide 714 in an engaged position forming a pathway 738 consistent with the disclosure. A cable flange 716 of the cable guide 714 can be located, at least partially, external to the housing 726 in order to define the pathway 738.

As previously described in connection with FIG. 6, the cable guide 714 is movable from the disengaged position to the engaged position. As used herein, the term "engaged position" refers to an orientation of the cable guide in which the cable guide is substantially disposed outside of the housing and a pathway is formed with the housing. In the engaged position, the cable guide 714 can provide a pathway for routing cables, as is further described herein.

In the engaged position, the latch tooth 706 is to engage with the second cable guide tooth 718-2 to secure the cable guide 714 in the engaged position. For example, when the force on the release tab 708 (e.g., previously described in connection with FIG. 6) is released, the projection of material comprising the second cable guide tooth 718-2 can be positioned substantially adjacent to the projection of material comprising the latch tooth 706 such that the interfacing second cable guide tooth 718-2 and the latch tooth 706 interfere with one another so as to prevent lateral (or substantially lateral) motion of the cable guide 714. For example, a spring tab 712 can cause an upward force on the latch 700 to cause the latch tooth 706 to engage with the second cable guide tooth 718-2 to move the latch 700 to the secure position to secure the cable guide 714 in the engaged position.

Such a position of the cable guide 714 can form a pathway 738. For example, the cable flange 716 and an outer surface of the housing 726 can form a pathway 738 to route a cable. As used herein, the term "pathway" refers to an opening formed by objects through which another object can be passed. For instance, a cable of a USB Type-C connector (e.g., or other cables/connectors) can be passed through the pathway 738.

As illustrated in FIG. 7, the second cable guide tooth 718-2 can include a series of projections of material. Such multiple projections of material can provide for different latching positions for the latch tooth 706 to be utilized to adjust a size of the pathway 738. The series of multiple projections of material can be oriented in a "sawtooth" fashion to provide for such different latching positions for the latch tooth 706. For example, as illustrated in FIG. 7, the cable guide 714 can be moved to an engaged position where the latch tooth 706 engages with the furthest left projection of material of the second cable guide tooth 718-2 (e.g., as oriented in FIG. 7) at a first latching position to form the pathway 738 having a sufficient size so as to allow a connector of a cable to pass through the pathway 738. The cable guide 714 can then be moved to a different engaged position where the latch tooth 706 engages with the middle or right most projection of material of the second cable guide tooth 718-2 (e.g., as oriented in FIG. 7) at a second or third latching position to reduce the size of the pathway 738 so as to prevent the cable from being removed or pulled from the pathway 738 (e.g., as the size of the connector of the cable is too large to pass back through the pathway 738). That is, the different latching positions of the second cable guide tooth 718-2 can be used to modify the size of the pathway 738. In other words, the latch tooth 706 can engage with different portions of the second cable guide tooth 718-2 (e.g., corresponding to the different latching positions) to modify the size of the pathway 738. Such use of different portions of the second cable guide tooth 718-2 to modify the size of the pathway 738 can provide a secure way to route cables utilizing the cable guide 714 by allowing cables to be passed through the pathway 738, and when the size of the pathway 738 is reduced, prevents such cables from being removed through the pathway 738. Further, such a size of the pathway 738 can be modified to accommodate a higher number of cables to be retained, among other examples.

As illustrated in FIG. 7, the cable guide 714 further includes the spring arm 724. The spring arm 724 can interface with the housing 726 when the cable guide 714 is in the engaged position. For example, the spring arm 724 can interface with the recessed surface 734 when the cable guide 714 is in the engaged position. The spring arm 724 can be adjacent (or substantially adjacent) to the recessed surface 734 when the cable guide 714 is moved to the engaged position. That is, the spring arm 724 can contact the recessed surface 734 to prevent the cable guide 714 from being completely moved out of the housing 726.

Figure 8:
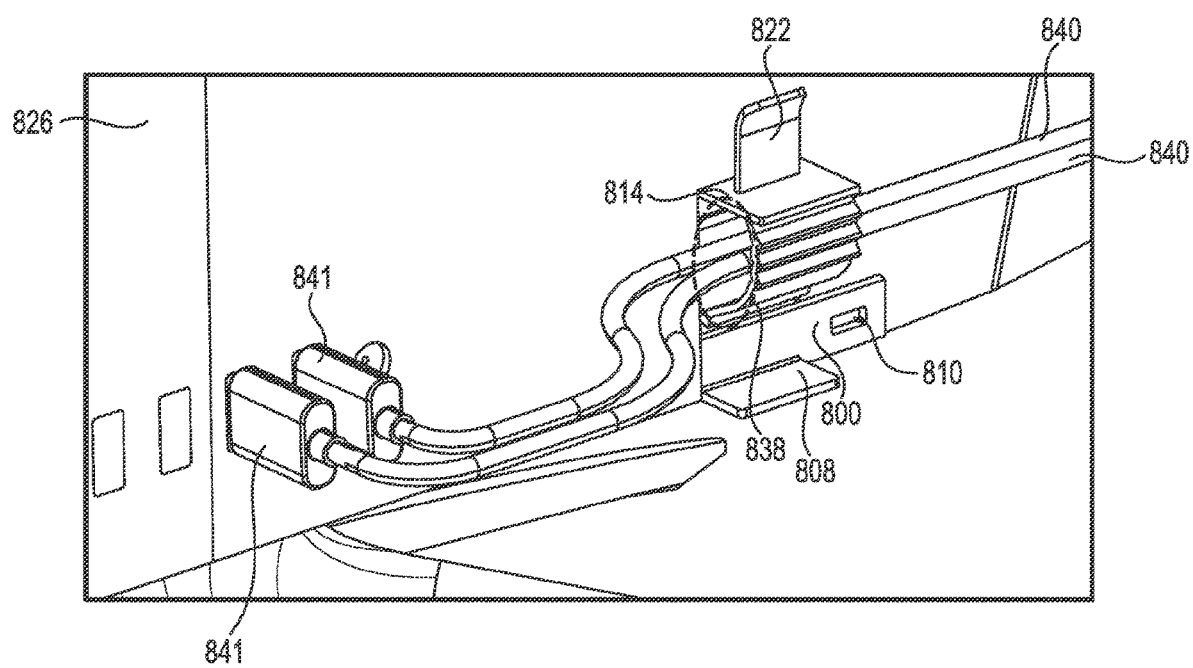
FIG. 8 is a perspective view of a housing, a latch in a secure position, and a cable guide in an engaged position forming a pathway to route cables consistent with the disclosure.

FIG. 8 is a perspective view of a housing 826, a latch 800 in a secure position, and a cable guide 814 in an engaged position forming a pathway 838 to route cables 840 consistent with the disclosure. The cable guide 814 and the housing 826 can form the pathway 838.

As illustrated in FIG. 8, the cables 840 can be routed through the pathway 838 and connectors 841 corresponding to the cables 840 can be connected to I/O ports of the housing 826. As illustrated in FIG. 8, the connectors 841 and corresponding cables 840 have been routed through the pathway 838 and the cable guide 814 is secured in the engaged position. As previously described in connection with FIG. 7, the size of the pathway 838 can be modified (e.g., utilizing different portions of the second cable guide tooth not illustrated in the perspective view of FIG. 8) such that the connectors 841 are unable to be routed back through the pathway 838, as the size of the connectors 841 exceed the size of the pathway 838. Such a modification of the size of the pathway 838 can prevent unintentional removal of the connectors 841 and associated cables 840 from the housing 826. However, if a user wished to remove or reroute the cables 840 and associated connectors, a user may simply depress the release tab 808 to move the latch 800 from the secure position to the release position and adjust a size of the pathway 838 by rotating the cable guide 814 via the operate tab 822.

In some examples, an unauthorized user may intend to remove the cables 840 and associated connectors 841 from the housing 826. As illustrated in FIG. 8, the latch 800 can further include the lock slot 810 which can receive a locking mechanism, as is further described in connection with FIG. 9.

Figure 9:
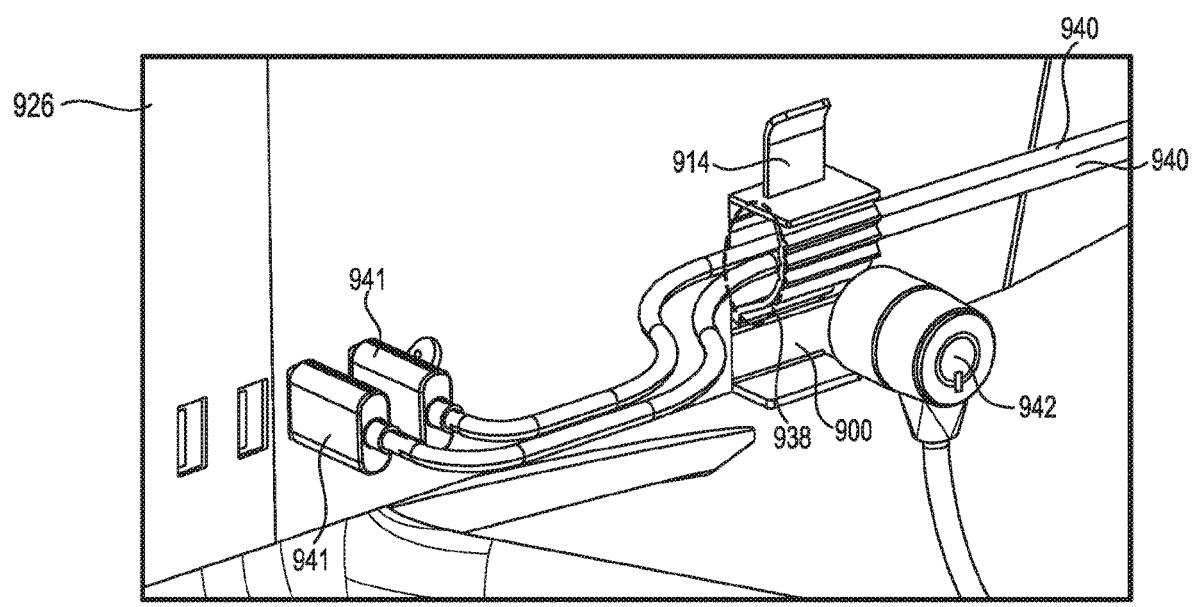
FIG. 9 is a perspective view of a housing, a latch in a secure position, a locking mechanism, and a cable guide in an engaged position forming a pathway to route cables consistent with the disclosure.

FIG. 9 is a perspective view of a housing 926, a latch 900 in a secure position, a locking mechanism 942, and a cable guide 914 in an engaged position forming a pathway 938 to route cables consistent with the disclosure. The cable guide 914 and the housing 926 can form the pathway 938.

As previously described in connection with FIG. 8, an unauthorized user may wish to remove the cables 940 and their associated connectors 941 from the housing 926, In order to prevent such an unauthorized removal, the lock slot of the latch 900 can receive a locking mechanism 942, As used herein, the term "locking mechanism" refers to a device to secure an object in a particular position. For example, the locking mechanism 942 can secure the latch 900 in the secure position. The locking mechanism 942 can prevent a user from depressing the latch 900, which can prevent rotation of the cable guide 914 and in turn prevent the size of the pathway 938 from being modified. Accordingly, the locking mechanism 942 can secure the cables 940 and their associated connectors 941 to the housing 926 to prevent unauthorized removal of the cables 940 and their associated connectors 941. As illustrated in FIG. 9, the locking mechanism 942 can be a Kensington lock (and the lock slot can be a Kensington Security Slot). However, examples of the disclosure are not so limited. For example, the locking mechanism 942 can be any other type of locking mechanism.

Cable guides according to the disclosure can allow for secure routing of cables in and/or around a housing. Such cable routing can provide for an organized and re-usable cable routing system that can prevent tangled cables and/or reduce clutter in and/or around the housing. Additionally, such a routing mechanism can allow for easier movement and/or removal of cables as compared with previous approaches. Further, the routing mechanism can provide increased security to prevent unauthorized removal of such cables from the housing as compared with previous approaches.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. An apparatus, comprising:
   a latch including a latch flange, wherein the latch flange includes a hook to interface with a housing; and
   a cable guide including a cable flange to interface with the latch, wherein:
      the cable flange is secured in the housing when the cable guide is in a disengaged position; and
      the cable flange and the housing are to form a pathway when the cable guide is in an engaged position.

2. The apparatus of claim 1, wherein:
   the cable flange includes a first cable guide tooth; and
   the latch flange includes a latch tooth to engage with the first cable guide tooth to secure the cable guide in the disengaged position when the latch is in a secure position.

3. The apparatus of claim 2, wherein in response to the latch being moved from the secure position to a release position, the cable guide is movable from the disengaged position to the engaged position.

4. The apparatus of claim 3, wherein the latch tooth is to engage with a second cable guide tooth to secure the cable guide in the engaged position.

5. The apparatus of claim 3, wherein the cable guide is movable from the disengaged position to the engaged position about an attachment annulus, wherein the cable guide is to connect with the housing via the attachment annulus.

6. The apparatus of claim 1, wherein the latch further includes a spring tab to bias the latch towards a secure position.

7. An apparatus, comprising:
   a latch including a latch flange, wherein the latch flange includes a latch tooth and a hook to interface with a housing; and
   a cable guide including a cable flange to interface with the latch, wherein:
      the cable flange includes a first cable guide tooth to engage with the latch tooth when the cable guide is in a disengaged position; and
      the cable flange includes a second cable guide tooth to engage with the latch tooth when the cable guide is in an engaged position such that the cable flange and the housing are to form a pathway when the cable guide is in the engaged position.

8. The apparatus of claim 7, wherein:
   the latch further includes a release tab; and
   the cable guide further includes an operate tab.

9. The apparatus of claim 8, wherein:
   in response to a first force on the release tab, the latch is to move from a secure position to a release position to cause the first cable guide tooth to disengage from the latch tooth; and
   in response to a second force on the operate tab, the cable guide is to move from the disengaged position to the engaged position.

10. The apparatus of claim 9, wherein in response to the second force being released from the release tab, the latch tooth is to engage with the second cable guide tooth to secure the cable guide in the engaged position.

11. The apparatus of claim 7, wherein the cable guide further includes a spring arm to interface with the housing when the cable guide is in the engaged position.

12. A system, comprising:
   a housing including a rib and a recessed surface;

a routing mechanism including:
  a latch including a latch flange and a lock slot, wherein:
    the latch flange includes a latch tooth and a hook to interface with the rib of the housing; and
    the lock slot is to receive a locking mechanism to secure the latch in a secure position;
  a cable guide including a cable flange, wherein the cable flange includes:
    a first cable guide tooth to engage with the latch tooth when the cable guide is in a disengaged position;
    a second cable guide tooth to engage with the latch tooth when the cable guide is in an engaged position such that the cable flange and the housing are to form a pathway when the cable guide is in the engaged position;
  an attachment annulus to connect the cable guide to the housing; and
  a spring arm to interface with the recessed surface when the cable guide is in the engaged position.

13. The system of claim 12, wherein the housing further includes a coupling annulus to attach the cable guide to the housing.

14. The system of claim 13, wherein:
the cable guide further includes an attachment annulus; and
the coupling annulus and the attachment annulus are to receive a pin when the coupling annulus and the attachment annulus are coaxially aligned to attach the cable guide to the housing.

15. The system of claim 12, wherein the housing further includes an anchor flange to interface with the latch flange, wherein the anchor flange is to secure the latch flange when the latch is moved from a secure position to a release position.

* * * * *